(No Model.) 2 Sheets—Sheet 1.

F. E. BARR.
PLANTER.

No. 444,228. Patented Jan. 6, 1891.

WITNESSES:
Alfred E. Glascock
M. E. Lansdale

INVENTOR
F. E. Barr
BY John S. Duffie
his ATTORNEY (No Model.) 2 Sheets—Sheet 2.

F. E. BARR.
PLANTER.

No. 444,228. Patented Jan. 6, 1891.

WITNESSES:
Alfred E. Glascock,
M. E. Lansdale

INVENTOR
F. E. Barr
BY John L. Duffie
his ATTORNEY

THE NORRIS PETERS CO., PHOTO-LITHO., WASHINGTON, D. C.

UNITED STATES PATENT OFFICE.

FREDRIC ELGIN BARR, OF SARATOGA, ARKANSAS.

PLANTER.

SPECIFICATION forming part of Letters Patent No. 444,228, dated January 6, 1891.

Application filed June 24, 1890. Serial No. 356,516. (No model.)

*To all whom it may concern:*

Be it known that I, FREDRIC ELGIN BARR, a citizen of the United States, residing at Saratoga, in the county of Howard and State of Arkansas, have invented certain new and useful Improvements in Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a combination seed dropper and planter, fertilizer-distributer, and cultivator; and the invention consists in the novel construction and arrangement of its several parts hereinafter described, and set out in the claims.

Figure 1:
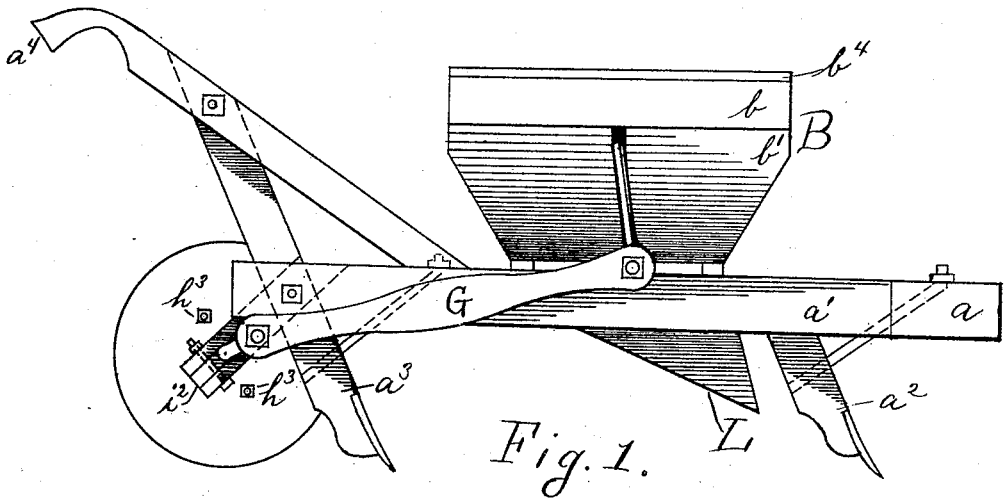
Figure 2:
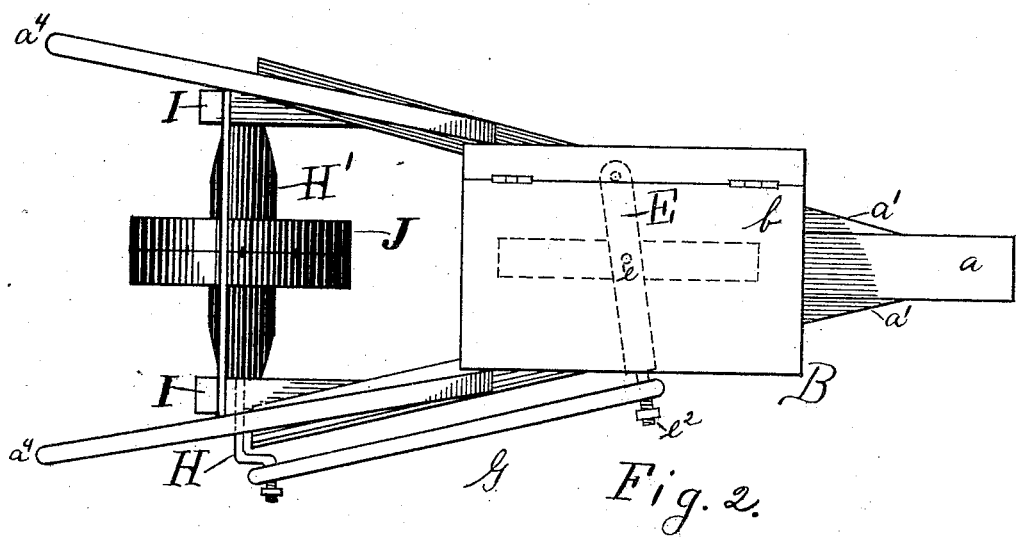
Figure 3:
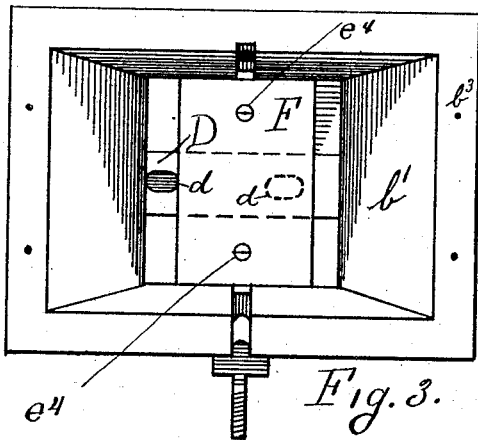
Figure 4:
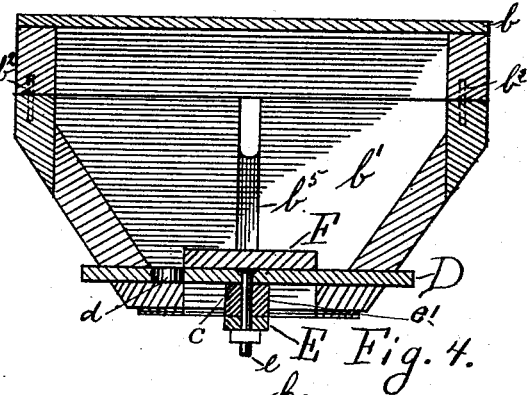
Figure 5:
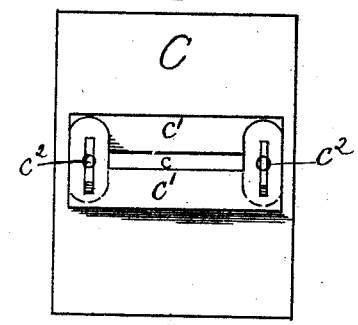
Figure 6:
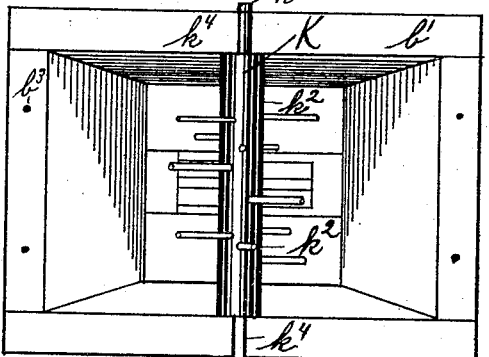
Figure 7:
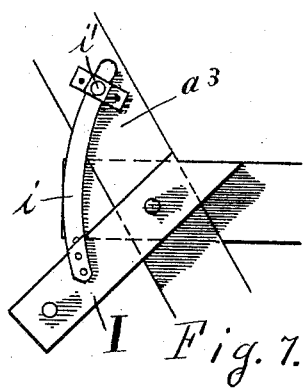
Figure 8:
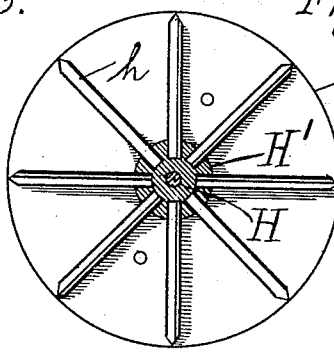
Figure 9:
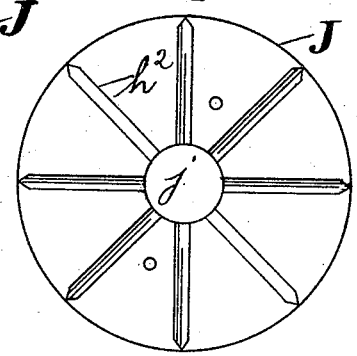

In the accompanying drawings, Figure 1 is a side elevation of my invention. Fig. 2 is a top plan view of the same. Fig. 3 is a view looking down into the hopper, the top being removed. Fig. 4 is a sectional view of a hopper and some of its mechanism. Fig. 5 is a view of the bottom of the hopper. Fig. 6 is a top view of the hopper, showing the agitator in position. Figs. 7, 8, and 9 are detail views.

My invention is described as follows: The frame is A-shaped, consisting of the tongue $a$ and the side pieces $a'$, having their front ends secured to the said tongue. In the tongue is secured a plow-standard $a^2$, and to the rear ends of the side pieces is secured plow-standards $a^3$, and to said side pieces and said rear standards are secured the handles $a^4$. On the top of the frame and immediately in front of the handles is secured a hopper B, which is divided into two parts, the upper part $b$ and the lower part $b'$. The two sections are united by pegs $b^2$, which fit in holes $b^3$, made correspondingly in the upper and lower parts of said hopper. The upper part of said hopper is provided with a lid $b^4$ and the lower part with grooves $b^5$, one on either side and on the inside of said hopper, so that a partition may be fitted into the hopper. The bottom C of said hopper is provided with a longitudinal slot $c$ for the grain to fall through, and the bottom side is also provided with seed-regulators $c'$, secured to the same by thumb-screws $c^2$. The bottom of said hopper is further provided with a seed-slide D, having one or more grain-cups $d$. Said seed-slide is secured to an arm E, the left-hand end of which is pivoted to the left side piece $a'$, and at its center it is pivoted to the said seed-slide. Its center bolt $e$ is provided with a roller $e'$, which works in the slot $c$ to prevent friction. Said seed-slide is kept in place by a cut-off plate F, held down to its work by screws $e^4$. The right-hand end of arm E terminates in a threaded extension $e^2$, and on said threaded extension is pivoted the front end of a pitman G, the rear end of which is connected to the crank end of the axle H. Said axle is journaled in the lower ends of the axle bearers or braces I, the upper ends of which are pivoted to the inside faces of the rear plow-standards $a^3$, and are so connected that their lower ends may be raised or lowered by means of the adjustable arms $i$ and thumb-screws $i'$. The center part of said axle H is covered by a wooden cylinder H', into which are set a number of spokes $h$ for making a bearing and operating wheel.

The machine is provided with wheels J, each having a center perforation $j$ large enough to fit over the axle H', and also has grooves $h^2$ cut on the inner face of each wheel, in which may be secured spokes $h$ when the two wheels are brought together, and when brought together they are secured by bolts and nuts $h^3$. There is also provided for said hopper an interchangeable agitator K, consisting of the shaft $k$, having the crank-handle $k'$, and the shaft $k^2$, fitting on the shaft $k$, carrying the pins $k^3$ for stirring and agitating the material being sown or distributed. The right-hand axle-bearer I has its lower end slotted, in which is fitted a block $i^2$, said block being held in place by a bolt and nut.

L is a chute to direct the seed into the furrow.

When I wish to plant corn, I use the seed-slide D, and if it is desired to plant corn and peas a seed-slide with two cups is used, the front cup working out and under the front part of the plate or cut-off E and the rear one out and under the rear part of said plate, in which case I have a partition-board fitting in the grooves $b^5$ to divide the corn from the peas; or, if it is desired to plant the corn very thick, I use the seed-slide with the two cups with or without the partition.

When it is desired to plant cotton, I remove the plate or cut-off F, seed-slide D, arm E, and its attachments, and introduce the agitator K and attach to its crank-arm the front end of the pitman G, and adjust the seed-regulators $c'$ so that they will drop the cotton-seed, as desired. The pitman G is operated by the wheels J and axle H'.

In planting corn or cotton in black land when it is a little wet I use the spoke-wheel alone, so as not to pack the dirt on the top of the seed; but in light soil, particularly if it is a little dry, I put on the two wooden wheels, so as to pack the dirt on the top of the seed to keep the air from getting to and drying them out before they come up.

When it is desired to take off the wheels J, the block $i^2$ is removed and the axle H comes out without trouble.

When I wish to put in the agitator K, the upper part $b$ of the hopper is removed, and the two ends of the axle $k$ are placed in the slots $k^4$ in the sides of said hopper, and replace the upper part which holds the said axle in place.

My invention can also be used as a fertilizer-distributer, which fertilizer can either be dropped in hills or in rows. If to be dropped in hills, the seed-slide is used, and if to be dropped in rows the regulators on the bottom are set at the required width. By removing the hopper and its attachments entirely and shifting the back plow-plates the machine may be converted into a cultivator.

Having described my invention, what I claim as new, and desire to secure by Letters Patent, is—

1. The combination of the frame provided with the plow-standards $a^2$ $a^3$ and the chute L, axle-bearers I, pivoted to the standards $a^3$, and one having in its lower end a slot and block $i^2$, semicircular arms $i$, adapted to lower and raise said bearers, the wheel J, having the grooves $h^3$, arms $h$, cylinder H', and axle H, having a crank-arm, hopper B, adapted to carry the seed-slide $b$ or agitator K, and pitman G, all substantially as shown and described, and for the purposes set forth.

2. The combination of the frame provided with the plow-standards $a^2$ $a^3$ and chute L, adjustable axle-bearers I, pivoted to the standards $a^3$, hopper B, secured to said frame and having the upper part $b$ and the lower part $b'$, held together by pins $b^3$, and having the slide-grooves $b^5$, top slots $k^4$, bottom slots $c$, and adjustable seed-regulator $c'$, said hopper adapted to carry the seed-slide D or agitator K, and pitman G, extending from said hopper to the crank-arm of the wheel J, all substantially as shown and described, and for the purposes set forth.

In testimony whereof I affix my signature in presence of two witnesses.

FREDRIC ELGIN BARR.

Witnesses:
J. A. SHEPPARD,
THOS. J. BOOKER.